Jan. 30, 1968  A. CHRISTENSEN  3,366,460
APPARATUS FOR EXOTHERMIC CATALYTIC REACTIONS
Filed March 11, 1964
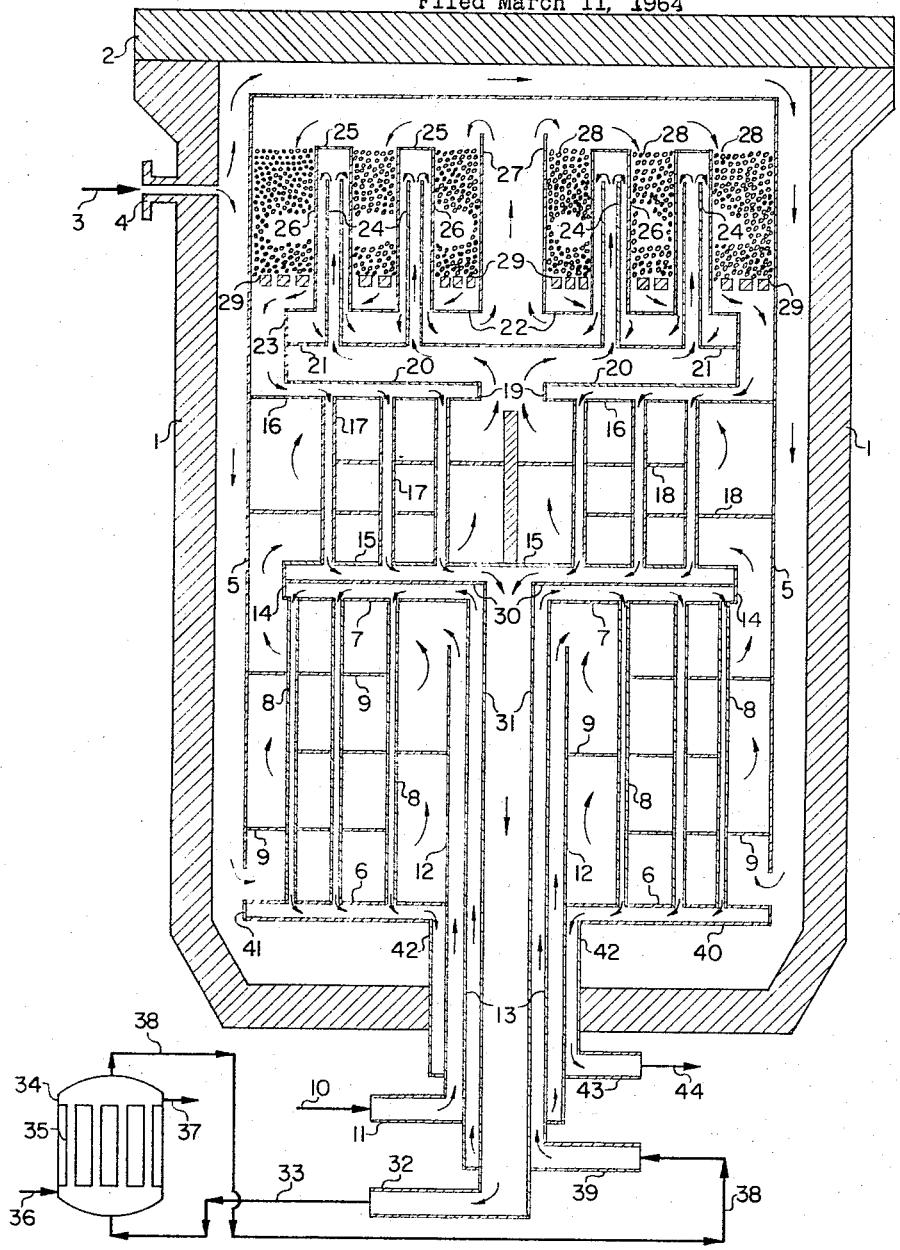
AXEL CHRISTENSEN.
INVENTOR.
BY J. T. Chaboty
AGENT

United States Patent Office 3,366,460
Patented Jan. 30, 1968

3,366,460
APPARATUS FOR EXOTHERMIC
CATALYTIC REACTIONS
Axel Christensen, Stamford, Conn., assignor to Chemical Construction Corporation, New York, N.Y., a corporation of Delaware
Filed Mar. 11, 1964, Ser. No. 351,151
7 Claims. (Cl. 23—289)

ABSTRACT OF THE DISCLOSURE

Apparatus is provided for exothermic catalytic reactions in which a process vapor or gaseous stream is passed through a stationary catalyst bed, and the resulting hot product stream is passed through external heat recovery means such as a steam boiler. Two heat exchange sections are provided in the reaction vessel in vertical series below the catalyst bed. The cold feed stream is passed in series through the lower heat exchanger, the upper heat exchanger, and the catalyst bed. The resulting hot reacted stream is passed through the upper heat exchanger and then passed external to the reaction vessel and to the external heat recovery means. The resulting partially cooled reacted stream is returned to the reaction vessel and passed through the lower heat exchanger for final cooling. The fully cooled reacted stream is then passed to product recovery.

---

This invention relates to an apparatus for effecting an exothermic vapor phase catalytic reaction wherein a gaseous reaction mixture is passed through a stationary catalyst bed. The invention provides an improved apparatus for the useful recovery of heat as steam or for heating purposes, when such heat is generated during exothermic vapor phase catalytic reactions which are conducted at high pressure. The invention is further concerned with the recovery of steam during such reactions as ammonia synthesis, synthesis of methanol from hydrogen and carbon monoxide, the Fischer-Tropsch synthesis of hydrocarbons and alkanols and other similar hydrogenation reactions.

The useful recovery of heat generated in high pressure exothermic catalytic reactions is an important consideration in the overall economic efficiency of such processes. In some cases, this heat is not recovered at its maximum available temperature level. Thus, according to U.S. Patent Nos. 2,861,873 and 3,041,151 (FIGURE 2), the hot reacted gas is passed in direct heat exchange with the incoming cold unreacted gas stream, to heat the unreacted gas to the required reaction temperature level. In this case, the reacted gas flows directly through a single heat exchanger in the lower portion of the reactor shell, and all of the net heat of reaction is retained as sensible heat in the gas finally leaving the reactor. Although considerable heat is contained in the final exit reacted gas as sensible heat, the temperature level at which it is available is too low for effective heat recovery. However, in some instances it has been found profitable to generate low pressure steam from this sensible heat.

Another method of obtaining steam from heat generated in the reactor is to provide a series of coils within the catalyst bed, through which purified water or other heat exchange medium is circulated to be heated. The purified water thereafter supplies heat to an external boiler. The main objection to this system is that the water or other heat exchange medium circulating in the coils must be of the highest degree of purity to prevent tube failure by corrosion in the presence of the excessive temperatures and pressures usually maintained in catalytic reactors. An additional disadvantage is the fact that if there is failure of the external boiler or auxiliaries, the entire system, both reactor and steam generating plant, must be shut down for repairs.

Finally, an apparatus design is known in which the hot or reacted gas is directly removed from the catalyst bed of the reactor to external heat recovery as in an external steam boiler, and then the partially cooled reacted gas is returned to the reactor for heat exchange with the incoming cold unreacted gas. Such apparatus arrangements are illustrated in U.S. Patent Nos. 3,041,151 (FIGURE 1) and 3,067,017. In these cases, it is necessary to provide expensive heat-resistant conduits for the transport of the hot reacted gas stream to external cooling.

In the present invention, a significant advance in overall heat recovery and process equipment economy is provided. The hot reacted gas is passed through an auxiliary or second heat exchange section within the reactor, for heat exchange with the unreacted gas. Then the partly cooled reacted gas is passed external to the reactor for further heat recovery, as in a steam boiler. The cooler reacted gas is now returned into the reactor, for final heat exchange with the incoming cold unreacted gas. Thus, two heat exchange sections are provided within the reactor apparatus, both serving to heat the incoming cold unreacted gas. The lower and first section heats the unreacted gas by heat exchange with partly cooled reacted gas derived from external heat recovery means, while the middle or second section heats the already somewhat warmed unreacted gas stream by heat exchange with the hot reacted gas stream directly derived from the catalyst bed.

The apparatus arrangement of the present invention provides noteworthy advantages. Heat may be recovered from the hot converted gas stream at any suitable or desired temperature level. Due to the preliminary cooling of the hot reacted gas stream in the second or middle heat exchange section, it is not necessary to provide expensive material of construction such as high alloy steel for the conduit serving to conduct the hot gas to external heat recovery means. Finally, an optimum amount of heat is recovered at a usable temperature level.

It is an object of the present invention to provide an improved apparatus for the recovery of heat from catalytic exothermic reactions.

Another object is to provide an apparatus in which heat may be recovered at any variable or suitable temperature level.

A further object is to eliminate the necessity for provision of high alloy conduits for removal of hot converted gas from catalytic reactors.

An additional object is to provide an apparatus for exothermic catalytic reactions in which two heat exchange sections are provided, for maximum temperature control and heat utilization.

These and other objects and advantages of the present invention will become evident from the description which follows. Referring to the figure, the high pressure reactor consists of a chamber defined by high pressure shell 1 and cap plate 2. Shell 1 consists basically of a vertically oriented cylindrical container. The cold unreacted feed gas stream 3 enters via inlet nozzle 4 and passes down through the annular space between shell 1 and vertical gas circulation plate 5. This path of flow for the cold unreacted gas provides maximum cooling for the shell 1. The gas stream leaves the annular space toward the bottom of the reactor chamber, and flows inward into the shell side of the lower heat exchanger section consisting of lower tube sheet 6, upper tube sheet 7, vertical tubes 8 and shell side gas baffles 9. The unreacted gas stream flowing upwards external to tubes 8 is warmed by indirect heat exchange with hot reacted gas flowing downwards inside tubes 8. Toward the upper or warm end of the heat exchanger, an additional quantity of cold feed gas may be intermixed with the warmed feed gas for temperature control. This additional quantity of cold feed gas is admitted via stream 10 which passes via inlet nozzle 11 into the annular space between concentric and coaxial conduits 12 and 13 and thence upwards to join the main stream of unreacted gas.

The warmed feed gas now passes upwards in the annular space between plate 5 and vertical peripheral baffle 14, and then passes into the shell side of the middle heat exchanger section defined by lower tube sheet 15, upper tube sheet 16, vertical tubes 17 and shell side gas baffles 18. The unreacted gas stream flowing upwards external to tubes 17 is further warmed by indirect heat exchange with reacted gas flowing downwards in tubes 17. This reacted gas is derived at a maximum temperature from the catalyst bed section in a manner to be described infra.

The further warmed unreacted gas is directed centrally inwards by upper tube sheet 16, and flows via vertical conduit 19 into the gas distribution section defined by baffle 20, lower perforated baffle 21 and upper perforated baffle 22. A peripheral vertical baffle 23 is also provided, which joins the outer edges of baffles 20, 21 and 22 adjacent to plate 5. The upwardly flowing unreacted gas stream passes from the conduit 19 into the space between baffles 20 and 21, and is distributed into inner conduits 24 which extend upwards from openings in baffle 21. Conduits 24 may be of an insulating nature, to prevent heat transfer into the unreacted gas as it flows upwards within the conduits 24. The gas stream is conducted to the top of conduits 24, and is thereafter diverted into a downwards flow by conduit covers 25 which close the top of outer conduits 26. The outer conduits 26 are coaxial with inner conduits 24 and extend downward to openings in baffle 22. Thus conduits 26 serve to define an annular passage in which the unreacted gas flows downwardly in parallel or concurrent flow to the reacting gas in the catalyst bed. The unreacted gas stream in the annular passage between conduits 24 and 26 is further heated by heat exchange with the hot reacting gas in the catalyst bed. Concomitant cooling of the catalyst bed is thus attained.

The hot unreacted gas stream is collected in the space between baffles 21 and 22, and is directed centrally inwards to central vertical duct 27. The hot gas, now at a temperature suitable for catalytic conversion, is passed by duct 27 to the top of catalyst bed 28. The hot unreacted gas stream is then dispersed into bed 28, flowing downward in contact with catalytic material at a temperature such that catalytic reaction or conversion takes place. The hot reacted gas now passes down from bed 28 through catalyst bed support grid 29, and is directed horizontally outward by baffle 22. The hot reacted gas next passes downward in the annular space between peripheral vertical baffle 23 and plate 5, and into the space defined between baffle 20 and tube sheet 16. The hot reacted gas then passes vertically downward through heat exchange tube 17, and is cooled by heat exchange with the unreacted gas to an intermediate lower temperature level.

The reacted gas stream, now cooled to a level which permits handling in conventional steel materials of construction rather than high alloy steel, is next diverted centrally inwards in the space between lower tube sheet 15 and partition baffle 30. The hot reacted gas now passes into central coaxial conduit 31, and flows downwards out of the reactor to external heat recovery. In a preferred embodiment, the heat recovery takes place by heat exchange with liquid water in a steam boiler, which is also schematically illustrated. The hot reacted gas thus passes from conduit 31 to outlet nozzle 32, and thence via 33 to steam boiler 34, which is typically a fire tube boiler. The process gas passes upwards through the tubes 35 of boiler 34, and is cooled by heat exchange with liquid water stream 36 admitted external to tubes 35. Generated steam is removed from boiler 34 at any suitable pressure level via stream 37, with the pressure level of the steam being limited by the available temperature of stream 33.

The reacted process gas stream now leaves boiler 34 via stream 38, and still contains a usable proportion of sensible heat. This heat in stream 38 is recovered by recycle of the reacted gas stream to the lower heat exchanger in the reactor 1. Thus, stream 38 is passed via nozzle 39 into the annular space between coaxial conduits 31 and 13, and flows upward to the space between baffle 30 and the upper tube sheet 7 of the lower heat exchanger. The reacted gas next passes downward through tubes 8, in heat exchange with cold unreacted gas. The fully cooled reacted gas is removed from the tubes 8 into the space defined between lower horizontal baffle 40 and tube sheet 6, with peripheral end closure by vertical baffle 41. The cold reacted gas next passes downwards in the annular space between conduit 12 and coaxial outer conduit 42. Finally, the cold reacted gas stream is removed from this annular space via outlet nozzle 43 and is passed to external utilization as stream 44.

Numerous alternatives within the scope of the present invention will occur to those skilled in the art. Thus, steam boiler 34 may be replaced by any other suitable heat recovery means. In addition, the catalyst bed configuration described supra represents merely a preferred embodiment, and other arrangements for passage to and through the catalyst bed 28 of the warmed unreacted gas flowing upwards in central conduit 19 will readily occur to those skilled in the art. For example, depending on reaction rates of the particular catalytic reaction contemplated, it could be feasible to omit baffle 22, outer conduits 26 and closures 25, as well as central vertical duct 27. In this case the gas stream would pass directly to the top of the catalyst bed through tubes 24, which would discharge the unreacted gas into the bed 28. In this case the tubes 24 would extend to the top of bed 28, and counter-current heat exchange would take place in the bed between the unreacted and reacting gas streams.

Other types of heat exchange apparatus such as fin-tube exchangers may be provided in practice. In addition, it will be evident that the baffle and tube arrangements may also be suitably modified so that the unreacted gas flows through the tubes and the hot reacted gas flows external to the tubes for heat exchange. These and other modifications obvious to those skilled in the art are contemplated as being within the scope of the present invention.

In a typical application of the apparatus of the present invention, a 100 tons/day ammonia converter was provided with a second middle heat exchanger in accordance with the present invention, to provide initial and partial heat exchange between the hot reacted gas and the warmed unreacted gas coming from a lower conventional heat exchange section. The temperature of the reacted gas leaving the catalyst bed and entering the middle heat exchange was 500° C., and this temperature was lowered to 350° C. by the special heat exchange arrangement of the present invention. This resulted in a total savings in materials of construction for handling the hot reacted gas of $25,000.

I claim:

1. Apparatus for conducting a gaseous exothermic catalytic reaction at elevated pressure with improved heat recovery which comprises a reactor shell, a first heat exchange section in the lower portion of said shell, a second heat exchange section in the middle portion of said shell, a catalyst bed in the upper portion of said shell, means to pass cold unreacted process gas stream into said reactor shell and through said first heat exchange section, whereby said cold unreacted gas stream is partially warmed, means to pass the partially warmed unreacted gas stream through said second heat exchange section, whereby said partially warmed gas stream is further warmed, means to pass said further warmed unreacted gas stream through said catalyst bed, whereby a hot reacted gas stream is produced, means to pass said hot reacted gas stream through said second heat exchange section, whereby said reacted gas stream is partially cooled by heat exchange with said partially warmed unreacted gas stream, means to pass said partially cooled reacted gas stream external to said reactor shell and through external means for heat recovery, whereby said reacted gas stream is further cooled, means to return said further cooled reacted gas stream into said reactor shell and through said first exchange section, whereby said further cooled reacted gas stream is cooled to a final low temperature level by heat exchange with said cold unreacted gas, and means to remove said finally cooled reacted gas stream from said reactor shell.

2. Apparatus of claim 1, in which said external means for heat recovery is a steam boiler.

3. Apparatus for conducting a gaseous exothermic catalytic reaction at elevated pressure with improved heat recovery which comprises a reactor shell, means for introducing cold unreacted gas into said shell, a lower heat exchanger section, means for passing said cold unreacted gas and partially cooled reacted gas in heat exchange relation through said lower heat exchanger section, a middle heat exchanger section, means for passing warmed unreacted gas from said lower heat exchanger section and hot reacted gas in heat exchange relation through said middle heat exchanger section, an upper catalyst bed section, a gas distributing section between said middle exchanger section and said catalyst bed section, said gas distributing section comprising upper and lower horizontal gas baffles extending to a vertical peripheral baffle adjacent to the inner surface of said shell, a plurality of substantially vertical inner conduits disposed within said bed for cooling, said inner conduits extending upwards into said bed from openings in said lower baffle, a plurality of outer conduits concentric with said inner conduits, said outer conduits extending upwards into said bed from openings in said upper baffle, said outer conduits being closed at their upper ends whereby warmed unreacted gas passes upwards from said middle exchanger section and is dispersed by said lower baffle through said inner conduits and then downwards in the annular space between said inner and outer conduits to cool said catalyst bed, a central vertical duct extending upwards from a central opening in said upper baffle to the top of said catalyst bed whereby hot unreacted gas is passed from the space between said baffles to said catalyst bed, means to pass downflowing hot reacted gas from said catalyst bed to said middle exchanger section, means to conduct partly cooled reacted gas from said middle exchanger section to heat recovery means external to said shell, means to conduct the further cooled reacted gas from said heat recovery means to said lower heat exchanger section within said shell, and means to conduct the fully cooled reacted gas from said lower heat exchanger section to utilization external to said shell.

4. Apparatus of claim 3, in which said heat recovery means external to said shell is a steam boiler.

5. Apparatus for conducting a gaseous exothermic catalytic reaction at elevated pressure with improved heat recovery which comprises a vertically oriented cylindrical reactor shell, a vertical gas circulation plate adjacent the inner perimeter of said shell, means for passing cold unreacted gas into the upper part of the annular space between said shell and said plate, whereby said cold unreacted gas passes downwards to the shell side of a lower heat exchanger section having vertical heat exchanger tubes, means to pass warmed unreacted gas from said lower heat exchanger section to the shell side of a middle heat exchanger section having vertical heat exchanger tubes, an upper catalyst bed section, a gas distributing section between said middle exchanger section and said catalyst bed section, said gas distributing section comprising upper and lower horizontal gas baffles extending to a vertical peripheral baffle adjacent to said plate, a plurality of substantially vertical inner conduits disposed within said bed for cooling, said inner conduits extending upwards into said bed from openings in said lower baffle, a plurality of outer conduits concentric with said inner conduits, said outer conduits extending upwards into said bed from openings in said upper baffle, said outer conduits being closed at their upper ends whereby warmed unreacted gas passes upwards from said middle exchanger section and is dispersed by said lower baffle through said inner conduits and then downwards in the annular space between said inner and outer conduits to cool said catalyst bed, a central vertical duct extending upwards from a central opening in said upper baffle to the top of said catalyst bed whereby hot unreacted gas is passed from the space between said baffles to said catalyst bed, means to pass downflowing hot reacted gas from said catalyst bed to the tubes of said middle exchanger section, means to conduct partly cooled reacted gas from the tubes of said middle exchanger section to a heat recovery steam boiler external to said shell, means to conduct the further cooled reacted gas from said steam boiler to the tubes of said lower heat exchanger section within said shell, and means to conduct the fully cooled reacted gas from the tubes of said lower heat exchanger section to utilization external to said shell.

6. Apparatus of claim 5, in which means is provided to by-pass a portion of the cold unreacted gas past said lower heat exchanger, the by-passed portion being passed into the lower part of said shell and added to the main stream of unreacted gas after said main stream passes through said lower heat exchange section.

7. Apparatus of claim 6, in which a first vertical conduit is provided centrally in the lower part of said shell for removal of partly cooled reacted gas from the tubes of said middle heat exchange section, a second coaxial conduit is provided external to said first vertical conduit to provide an annular passage for return of further cooled reacted gas to said lower heat exchange section, a third coaxial conduit is provided external to said second conduit to provide an annular passage for said admittance of cold by-pass unreacted gas to the main stream of warmed unreacted gas, and a fourth coaxial conduit is provided external to said third conduit to provide an annular passage for removal of cold reacted gas from said lower heat exchange section, said first, second, third and fourth vertical coaxial conduits being provided with respective gas passage means at the base of said reactor shell.

References Cited
UNITED STATES PATENTS

Re.192,243   7/1934   Richardson _____ 23—289
3,041,151   6/1962   Christensen _____ 23—289

JOSEPH SCOVRONEK, *Primary Examiner.*